(12) United States Patent
Corets

(10) Patent No.: US 8,875,965 B2
(45) Date of Patent: Nov. 4, 2014

(54) STRAP ASSEMBLY FOR PERSONAL ITEMS

(76) Inventor: Beth A. Corets, Los Angeles, CA (US)

(*) Notice: Subject to any disclaimer, the term of this patent is extended or adjusted under 35 U.S.C. 154(b) by 227 days.

(21) Appl. No.: 12/639,692

(22) Filed: Dec. 16, 2009

(65) Prior Publication Data

US 2010/0147913 A1    Jun. 17, 2010

Related U.S. Application Data

(60) Provisional application No. 61/122,913, filed on Dec. 16, 2008.

(51) Int. Cl.
*A45F 5/00* (2006.01)
*A47G 29/08* (2006.01)
*B60R 7/04* (2006.01)
*A45C 13/00* (2006.01)

(52) U.S. Cl.
CPC .............. *B60R 7/043* (2013.01); *A47G 29/083* (2013.01); *A45C 13/001* (2013.01)
USPC ...................................................... 224/666

(58) Field of Classification Search
CPC ............. A45F 5/02; A45F 5/021; A45F 5/00; A45F 2005/006; A45F 3/14; A45F 2200/0558; A44B 15/00
USPC ........... 224/269, 666, 667, 669, 670; 24/3.13, 24/3.5, 3.6; 206/37.1, 37.8
See application file for complete search history.

(56) References Cited

U.S. PATENT DOCUMENTS

| | | | |
|---|---|---|---|
| 475,503 A | 5/1892 | Hock | |
| 781,629 A * | 2/1905 | Ahlstrom | 224/251 |
| 1,110,760 A * | 9/1914 | Easton | 206/37.1 |
| 1,213,758 A | 1/1917 | Delaney | |
| 1,368,156 A * | 2/1921 | Jackson | 24/3.6 |
| 1,643,106 A | 9/1927 | Williams | |
| 1,811,327 A * | 6/1931 | Parrella | 206/37.8 |
| 2,066,472 A * | 1/1937 | Johnson | 206/37.8 |
| 2,625,191 A * | 1/1953 | Sherwood | 206/37.1 |
| 2,779,523 A | 1/1957 | Klimkiewicz | |
| 2,783,926 A * | 3/1957 | Wise | 224/667 |
| 3,863,477 A * | 2/1975 | Klein | 70/456 R |
| 3,881,534 A | 5/1975 | Gist | |
| 3,949,915 A * | 4/1976 | Burhans | 224/269 |
| 3,958,731 A | 5/1976 | Riedle | |
| D285,865 S * | 9/1986 | Gamble | D3/210 |
| 4,759,431 A | 7/1988 | King et al. | |

(Continued)

FOREIGN PATENT DOCUMENTS

| KR | 10-0477183 | 3/2005 |
|---|---|---|
| KR | 2005-5039114 | 4/2005 |
| WO | WO 99-29208 | 6/1999 |

OTHER PUBLICATIONS

Talus, "Website", http://www.organize.com/carhooks.html, (Nov. 19, 2008).

*Primary Examiner* — Adam Waggenspack
(74) *Attorney, Agent, or Firm* — Tsircou Law, P.C.

(57) ABSTRACT

A strap assembly is provided for securing personal containers. The strap assembly includes an elongated central strap body and first and second carabiners at opposing ends of the strap body. The strap assembly can further include an elongated secondary strap having a first end attached to the central strap body and a second end configured such that the second end can attach to either the first carabiner or the second carabiner interchangeably.

9 Claims, 2 Drawing Sheets

(56) References Cited

U.S. PATENT DOCUMENTS

| | | | | |
|---|---|---|---|---|
| 4,804,122 | A | 2/1989 | Knox | |
| 4,958,758 | A | 9/1990 | Tipple et al. | |
| 5,005,266 | A | 4/1991 | Fister et al. | |
| 5,070,581 | A * | 12/1991 | Senter | 24/3.5 |
| 5,144,724 | A | 9/1992 | Chuan | |
| 5,311,972 | A | 5/1994 | Plath | |
| 5,335,835 | A * | 8/1994 | Hogan | 224/257 |
| 5,501,308 | A | 3/1996 | King | |
| 5,533,656 | A * | 7/1996 | Bonaldi | 224/667 |
| 5,540,367 | A * | 7/1996 | Kauker | 224/269 |
| 5,593,009 | A | 1/1997 | King | |
| 5,785,011 | A | 7/1998 | Gitterman, III | |
| 5,816,458 | A * | 10/1998 | Yonenoi | 224/182 |
| 5,829,559 | A | 11/1998 | Nordstrom et al. | |
| 5,842,673 | A | 12/1998 | Fenton | |
| 5,915,631 | A | 6/1999 | Laxton et al. | |
| 6,047,754 | A | 4/2000 | Drum | |
| 6,216,322 | B1 | 4/2001 | Kuo | |
| 6,334,239 | B1 * | 1/2002 | Kraut | 24/3.6 |
| 6,347,693 | B1 | 2/2002 | Chen | |
| D454,054 | S * | 3/2002 | Kelleghan | D8/356 |
| 6,606,769 | B1 * | 8/2003 | Harris | 24/599.2 |
| 7,036,780 | B1 | 5/2006 | Geninatti | |
| 7,343,647 | B1 | 3/2008 | Kinskey et al. | |

* cited by examiner

STRAP ASSEMBLY FOR PERSONAL ITEMS

CROSS REFERENCE TO RELATED APPLICATION

This application claims benefit of U.S. Provisional Application No. 61/122,913, filed Dec. 16, 2008, which is herein incorporated by reference.

FIELD OF THE INVENTION

The present invention relates generally to strap assemblies and, more particularly, to strap assemblies configured to secure a personal items, such as a purse, briefcase, and shopping bag, to a support structure.

BACKGROUND OF THE INVENTION

Individuals often use personal containers, such as purses, briefcases, and shopping bags, to carry items. Such containers often include a hand or shoulder strap and have a top opening to access an interior compartment of the container. However, some personal containers lack closures that completely seal its opening. Even with bags having closures, individual my neglect to use the closure properly. Thus, there is a risk that contents of the container can spill out if knocked over.

In addition, individual use such personal containers to carry valuables. Often, it can be difficult or inconvenient to have positive control over the container, which can increase the risk of having a container lost or stolen.

It should, therefore, be appreciated that there is need for a device that addresses these shortfalls. The present invention fulfills this need and others.

SUMMARY OF THE INVENTION

The invention provides a strap assembly for securing personal containers. The strap assembly includes an elongated central strap body and first and second carabiners at opposing ends of the strap body. The strap assembly can further include an elongated secondary strap having a first end attached to the central strap body and a second end configured such that the second end can attach to either the first carabiner or the second carabiner interchangeably.

In a detailed aspect of an exemplary embodiment of the invention, the strap body can define an enclosure disposed between the first and second end for receiving the secondary strap. An end of the secondary strap can be secured to the central strap body within the enclosure.

In another detailed aspect of an exemplary embodiment of the invention, an attachment ring can be coupled to the first end of the central strap body adjacent to the first carabiner such that a second end of the support strap can be attached thereto for securing items.

In another detailed aspect of an exemplary embodiment of the invention, the strap body further includes a flap extending over an opening to an enclosure disposed between the first and second end for receiving the secondary strap.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which.

DETAILED DESCRIPTION OF THE PREFERRED EMBODIMENTS

Figure 1:
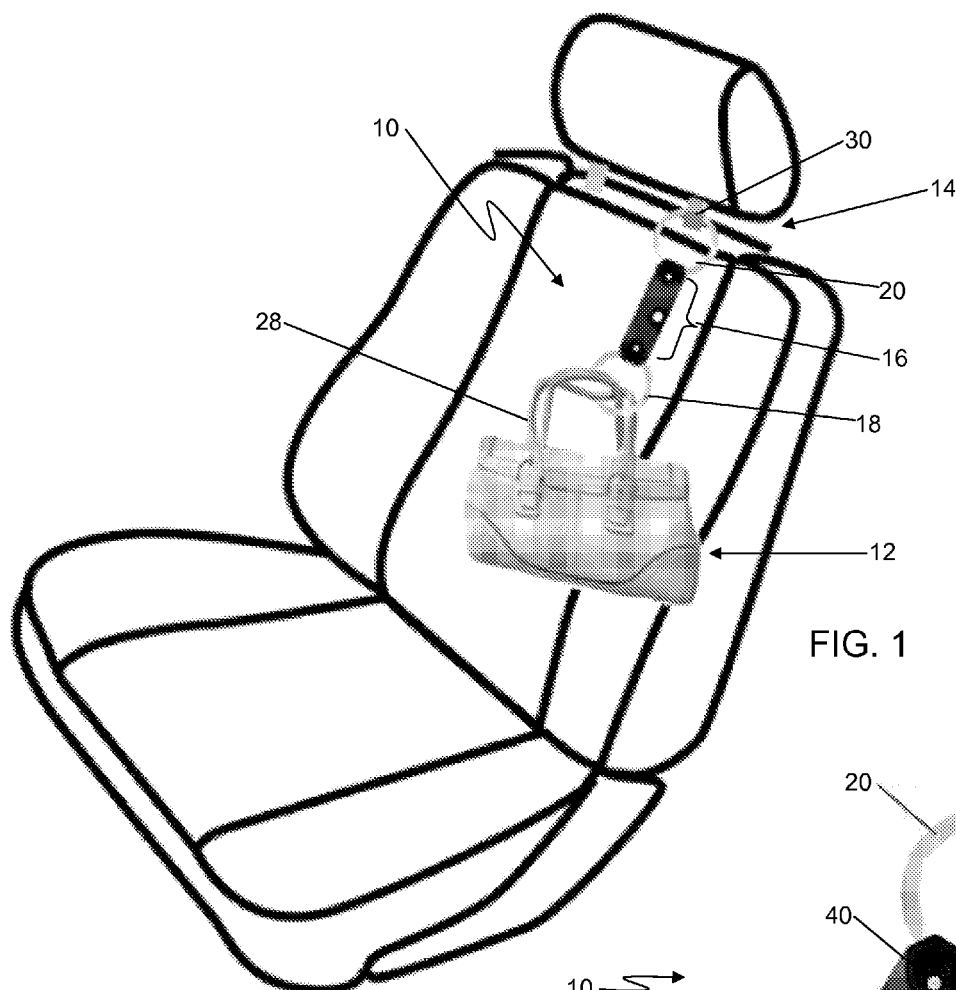
FIG. 1 is a perspective view of a first embodiment of a strap assembly in accordance with the invention, the strap assembly securing a purse to a headrest of a car seat.
Figure 2:
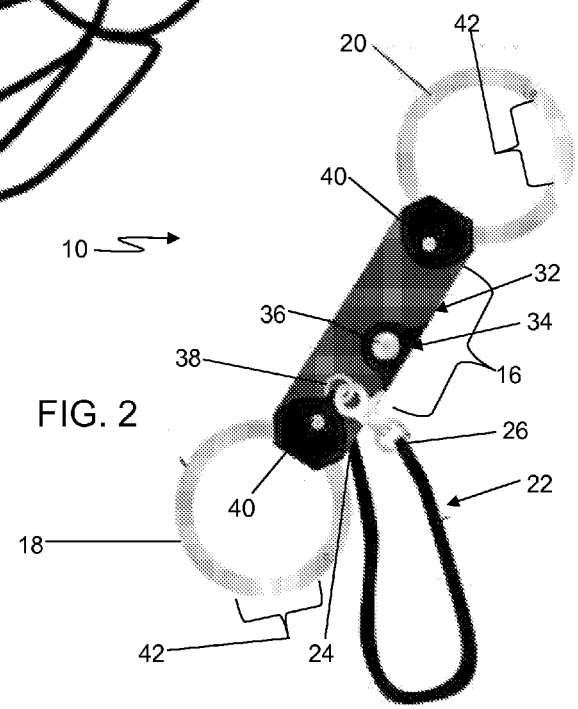
FIG. 2 is an elevational view of the strap assembly of FIG. 1.

Referring now to the drawings, and particularly FIGS. 1 and 2, there is shown a strap assembly 10 for securing personal containers, such as a purse 12, to a support structure 14. The strap assembly includes an elongated strap body 16 and two carabiners (18, 20) attached to opposing ends of the strap body. The strap assembly further includes an elongated secondary strap 22 that facilitates multiple configurations for securing personal containers to support structures. The secondary strap includes a first end 24 attached to the central strap body 16 and a free second end 26 configured to be detachably secured to various points of the strap assembly, including either the first carabiner 18 or the second carabiner 20. As a result, the strap assembly provides multiple configurations for securing personal containers to support structure, in a convenient and intuitive manner.

FIG. 1 depicts an exemplary use for the strap assembly 10, in which an automobile driver secures her purse to a passenger car seat. In this first example, the first carabiner 18 of the strap assembly 10 is attached to handles 28 of the purse 12. The second carabiner 20 is attached a headrest post 30. Beneficially, the strap assembly secures the purse in place, even if the drivers must slow or turn rapidly, without concern that the purse might fall over, spilling its contents. In addition, the driver could quickly access contents within the purse.

With reference now to FIG. 2, the strap body 16 provides a pocket 32 for storing the secondary strap 22. More particularly, the strap body defines an opening to the pocket proximate to a longitudinal side thereof and includes a flap 34 that extends over the opening. A fastener 36 is provided to secure the flap in place. As discussed with regard to other examples below, the pocket can be sized and oriented in various other configurations, or excluded entirely.

In this embodiment, the first end 24 of the secondary strap 22 is attached to the strap body within the confines of the pocket. In this manner, the secondary strap can be housed within the pocket when not in use. In other embodiments, the secondary strap can be attached at other locations on the strap assembly, or excluded entirely. The first end of the secondary strap is securely attached to the strap body, e.g., via stitching, rivets, adhesive, or other manners known in the art, such that it can endure anticipated loads.

The strap assembly 10 further includes an attachment ring 38 coupled to the strap body 16. In this embodiment, the attachment ring is coupled to the first end of the strap body, adjacent to the first carabiner 18. The attachment ring can be used as an attachment location for the second free end 26 of secondary strap 22.

The strap body 16 is formed of durable material, e.g., such as, leather or leather-like material, fabric and so on. The ends of the strap body are configured to be secured to the carabiners 18, 20 in manner to endure anticipated loads, e.g., stitching or rivets. In the exemplary embodiment, rivets 40 are used.

The carabiners have a generally circular configuration. Each carabiner includes a gate 42. The gates are configured to ensure ease of use. For example, the gates are sized to enable easy access for securing items to the carabiner. In the exemplary embodiment, the gate extends about 90 degrees about the circumference of the carabiner. In other embodiments, various other configurations for the carabiner can be used. Additional examples are discussed below.

Figure 3:
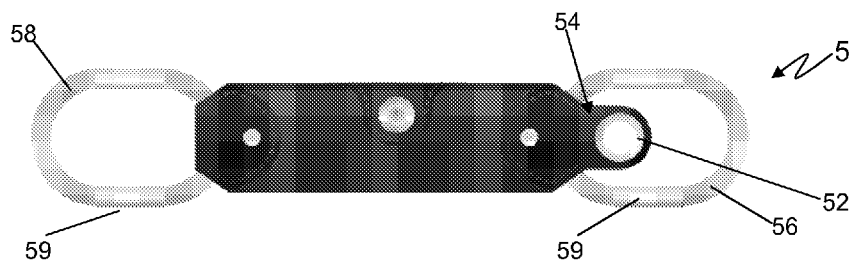
FIG. 3 is an elevational view of a second embodiment of a strap assembly in accordance with the invention.

With reference now to FIG. 3, a strap assembly 50 is shown, having a support strap (not shown) disposed in a pocket. The strap assembly includes an attachment ring 52 defined by a portion of the strap body 54 that extends beyond the attachment location of the first carabiner 56. The carabiners 56, 58 have a generally oval configuration. Each carabiner includes a gate 59 defined along a side of the carabiner.

Figure 4:
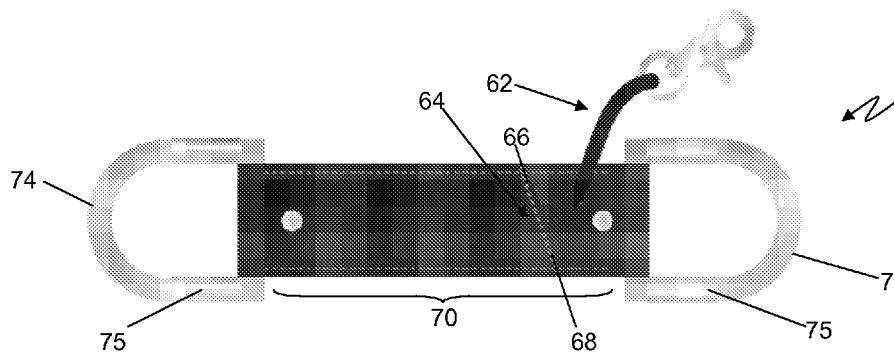
FIG. 4 is an elevational view of a second embodiment of a strap assembly in accordance with the invention

FIG. 4 depicts a strap assembly 60 having a support strap 62 extending out of a pocket 64. An opening to the pocket opening extends between side edges 66, 68 of the strap body 70. The carabiners 56, 58 have a generally D-ring configuration, and each carabiner includes a gate 75 defined along a side of the carabiner.

Figure 5:
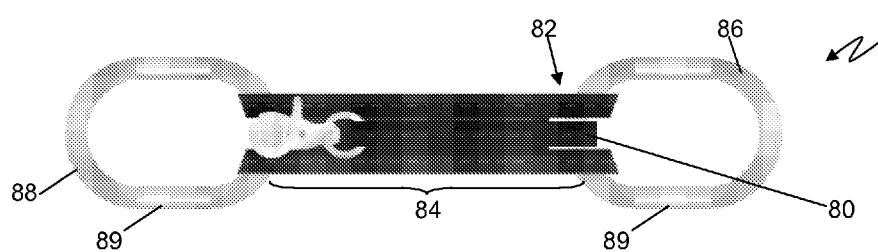
FIG. 5 is an elevational view of a second embodiment of a strap assembly in accordance with the invention.

With reference now to FIG. 5, a strap assembly 80 is shown, having a support strap 82 extending from an end 84 of the strap body 86. The carabiners 86, 88 have a generally oval configuration, and each carabiner includes a gate 89 defined along a side of the carabiner.

Figure 6:
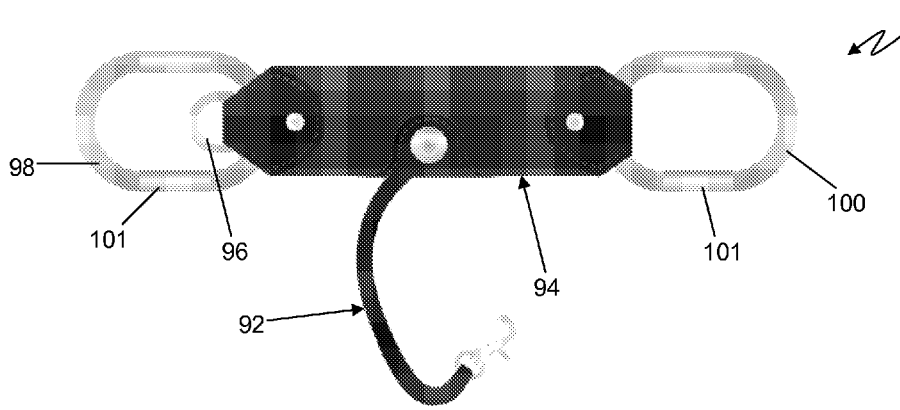
FIG. 6 is an elevational view of a second embodiment of a strap assembly in accordance with the invention.

FIG. 6 depicts a strap assembly 90 having a support strap 92 and a pocket 94. The strap assembly includes an attachment ring 96 that extends beyond the attachment location of the first carabiner 98. The carabiners have a generally oval configuration. Each carabiner includes a gate 101 defined along a side of the carabiner.

It should be appreciated from the foregoing that the present invention provides a strap assembly for securing personal containers. The strap assembly includes an elongated central strap body and first and second carabiners at opposing ends of the strap body. The strap assembly can further include an elongated secondary strap having a first end attached to the central strap body and a second end configured such that the second end can attach to either the first carabiner or the second carabiner interchangeably.

Although the invention has been disclosed in detail with reference only to the exemplary embodiments, those skilled in the art will appreciate that various other embodiments can be provided without departing from the scope of the invention. Accordingly, the invention is defined only by the claims set forth below.

What is claimed is:

1. A strap assembly for securing personal containers, comprising:
    an elongated central strap body having a first end, a second end, and two longitudinal sides extending between the first end and the second end, the strap body defines a single enclosure having a single opening that extends along one of the longitudinal sides of the strap body, the strap body further having a flap that extends over the opening;
    a first carabiner attached to the first end of the strap body, the first carabiner having circular, oval, elliptical, or d-shaped configuration including a curved gate;
    a second carabiner attached to the second end of the strap body, the second carabiner having circular, oval, elliptical, or d-shaped configuration including a curved gate, wherein the first and the second carabiners are identically sized and shaped; and
    an elongated secondary strap having a first end permanently attached to the strap body within the single enclosure such that the secondary strap can be stored within the enclosure when not in use, the secondary strap further having a second end configured such that the second end can detachably couple to either the first carabiner or the second carabiner interchangeably;
    wherein the elongated secondary strap is sized to be confined entirely within the enclosure and the elongated secondary strap is the only structure having a portion attached within the enclosure that can both extend out of the enclosure and can be confined therein.

2. A strap assembly as defined in claim 1, wherein the strap body further includes a fastener configured to secure the flap over the opening.

3. A strap assembly as defined in claim 2, wherein the strap body further includes a supplemental attachment ring that is smaller than the first and second carabiner positioned along the body of the strap to enable the second end of the secondary strap to detachably couple thereto.

4. A strap assembly as defined in claim 1, wherein the strap body is formed of leather.

5. A strap assembly as defined in claim 1, wherein the first and the second carabiners are shaped free of straight portions.

6. A strap assembly for securing personal containers, comprising:
    a central strap body having substantially rectangular shape, including a first end, a second end, and two longitudinal sides extending between the first end and the second end, the strap body defines a single pocket and an opening to the single pocket that extends along one of the longitudinal sides of the strap body, the strap body includes a flap that extends over opening;
    a first carabiner attached to the first end of the strap body by an extension of the strap body that loops over the first carabiner, the first carabiner including a curved gate;
    a second carabiner attached to the second end of the strap body by an extension of the strap body that loops over the second carabiner, the second carabiner including a curved gate, wherein the first and the second carabiners are identically sized and shaped; and
    an elongated secondary strap having a first end permanently attached to the strap body within the pocket, the secondary strap further having a second end, the secondary strap sized to extended out of the opening such that the second end can detachably couple to either the first carabiner or the second carabiner interchangeably; wherein the elongated secondary strap is sized to be confined entirely within the enclosure and the elongated secondary strap is the only structure having a portion attached within the pocket that can both extend out of the pocket and can be confined therein.

7. A strap assembly as defined in claim 6, wherein the secondary strap includes an attachment ring at the second end.

8. A strap assembly as defined in claim 6, wherein the first and the second carabiners have a circular shape.

9. A strap assembly as defined in claim 6, wherein the strap body is formed of leather.

* * * * *